(12) United States Patent
Schulz et al.

(10) Patent No.: US 7,718,974 B2
(45) Date of Patent: May 18, 2010

(54) X-RAY CONVERTER ELEMENT

(75) Inventors: Reiner Franz Schulz, Dormitz (DE);
Manfred Fuchs, Nürnberg (DE); Georg Wittmann, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/842,274

(22) Filed: Aug. 21, 2007

(65) Prior Publication Data

US 2008/0043915 A1     Feb. 21, 2008

(30) Foreign Application Priority Data

Aug. 21, 2006  (DE) .................. 10 2006 038 969

(51) Int. Cl.
*H05G 1/64* (2006.01)
(52) U.S. Cl. ................................. 250/370.11
(58) Field of Classification Search ........... 250/370.09, 250/370.11, 483.1
See application file for complete search history.

(56) References Cited

U.S. PATENT DOCUMENTS

| | | | | |
|---|---|---|---|---|
| 4,151,319 A * | 4/1979 | Sackoff et al. ............. 428/41.4 |
| 4,547,670 A * | 10/1985 | Sugimoto et al. ....... 250/370.13 |
| 5,194,455 A * | 3/1993 | Massow et al. ............. 522/152 |
| 5,804,832 A * | 9/1998 | Crowell et al. .............. 250/580 |
| 6,025,598 A * | 2/2000 | Tago ..................... 250/370.01 |
| 6,172,371 B1 * | 1/2001 | DeJule et al. .......... 250/370.11 |
| 6,352,875 B1 * | 3/2002 | Hayashi et al. .............. 438/67 |
| 6,353,228 B1 * | 3/2002 | Itabashi ................ 250/370.11 |
| 6,429,430 B2 * | 8/2002 | Sato et al. ................ 250/363.01 |
| 6,667,480 B2 * | 12/2003 | Kajiwara et al. ....... 250/370.01 |
| 6,692,836 B2 * | 2/2004 | Reichert et al. ............. 428/469 |
| 6,747,277 B2 * | 6/2004 | Mori et al. ............. 250/370.11 |
| 6,800,836 B2 * | 10/2004 | Hamamoto et al. ....... 250/208.1 |
| 7,034,306 B2 * | 4/2006 | Homme et al. .............. 250/368 |
| 7,112,802 B2 * | 9/2006 | Ogawa .................. 250/370.11 |
| 2001/0006214 A1 * | 7/2001 | Boerner et al. .............. 250/368 |
| 2001/0045522 A1 * | 11/2001 | Homme et al. .......... 250/361 R |
| 2002/0017613 A1 * | 2/2002 | Homme et al. ......... 250/370.11 |
| 2002/0066860 A1 * | 6/2002 | Possin ................... 250/370.08 |
| 2002/0074502 A1 * | 6/2002 | Takabayashi et al. ....... 250/368 |
| 2002/0168793 A1 * | 11/2002 | Izumi et al. ................... 438/73 |
| 2002/0195568 A1 * | 12/2002 | Mori et al. ............. 250/370.11 |
| 2003/0042424 A1 * | 3/2003 | Eberhard et al. ....... 250/370.11 |
| 2003/0160185 A1 * | 8/2003 | Homme ................... 250/483.1 |
| 2004/0000644 A1 * | 1/2004 | Homme .................. 250/361 R |
| 2004/0053001 A1 * | 3/2004 | Abrams ....................... 428/90 |
| 2004/0089813 A1 * | 5/2004 | Takabayashi et al. .. 250/370.11 |
| 2004/0155320 A1 * | 8/2004 | DeJule et al. ............... 257/659 |
| 2004/0195514 A1 | 10/2004 | Nagano |
| 2004/0211910 A1 * | 10/2004 | Izumi et al. ............ 250/370.11 |
| 2004/0211911 A1 * | 10/2004 | Hata ...................... 250/370.11 |

(Continued)

FOREIGN PATENT DOCUMENTS

EP     1 118 878 A1     7/2001

(Continued)

*Primary Examiner*—David P Porta
*Assistant Examiner*—Djura Malevic
(74) *Attorney, Agent, or Firm*—Schiff Hardin LLP

(57) ABSTRACT

An x-ray converter element has an x-ray-permeable and moisture-impermeable substrate, an x-ray-permeable carrier that is connected to the substrate, and a scintillator that is applied on the substrate, and an optically-transparent and moisture-impermeable protective layer that covers the scintillator.

13 Claims, 2 Drawing Sheets

U.S. PATENT DOCUMENTS

| | | |
|---|---|---|
| 2004/0245474 A1 | 12/2004 | Vieux et al. |
| 2005/0035298 A1* | 2/2005 | Okada et al. ........... 250/370.11 |
| 2005/0072931 A1* | 4/2005 | Albagli et al. ......... 250/370.11 |
| 2006/0038132 A1 | 2/2006 | Hayashida |
| 2006/0108683 A1* | 5/2006 | Takeda ....................... 257/723 |

FOREIGN PATENT DOCUMENTS

| | | | |
|---|---|---|---|
| JP | 2004301516 A | * | 10/2004 |
| JP | 2005091221 A | * | 4/2005 |

* cited by examiner

X-RAY CONVERTER ELEMENT

BACKGROUND OF THE INVENTION

1. Field of the Invention

The present invention concerns an x-ray converter element.

2. Description of the Prior Art

An x-ray converter element is a component of a digital detector for radiography that is, for example, described in the article by R. F. Schulz, "Digitale Detektorsysteme für die Projektionsradiographie" in Fortschr. Röntgenstr. (2001) 173, pages 1137 to 1146, in particular illustration 5.

The x-ray converter element (that includes a scintillator) is conventionally used in combination with a CCD camera (CCD—charge-coupled device). Most of the incident x-ray radiation is absorbed in the scintillator (luminescent screen) and converted into visible light. The light image is projected onto the CCD camera with the aid of imaging optics (for example optical lenses, mirrors, prisms etc.). The CCD camera transduces the light image into electrical signals. The electrical signals are further processed and are output as a digital image.

This detector system has the advantage that it is composed only of relatively easily obtainable and inexpensive components and therefore can be produced in a relatively cost-effective manner. Such a detector system thus represents a relatively cost-effective solution with the known advantages of a digital detector system (film-less, image processing etc.).

The dose requirement in such a detector system is comparable to the dose requirement of classical film-foil systems. The dose savings that is possible to achieve with a planar image detector (flat panel detector) cannot be achieved with this detector system. Flat panel detectors are described in the article by M. Spahn et al. "Flachbilddetektoren in der Röntgendiagnostik" in "Der Radiologe 43 (2003)", pages 340 through 350.

The reason for the relatively high dose requirement in radiography is the occurrence of phenomena known as "secondary quantum sinks".

The signal-to-noise ratio of an ideal x-ray detector (negligible electronic noise, no structural noise) is defined by the number of the absorbed x-ray quanta and is designated as a "primary quantum sink".

In a flat panel detector an absorbed x-ray quantum is transduced into, for example, 1000 electrons. The additional statistical electron noise thus is negligible due to the relatively large number of electrons.

However, when fewer than 10 electrons are generated per x-ray quantum, this additional noise is no longer negligible and impairs the image quality or increases the dose requirement. This is designated as a "secondary quantum sink". This is explained in the publication by R. M. Gagne et al., "Optically coupled digital radiography: sources of inefficiency" in "Processing. SPIE Vol. 4320 (2001)", pages 156 to 162.

It is a basic requirement of the scintillator that every x-ray quantum striking the scintillator should generate an optimally large number of light quanta in the scintillator that must in turn be optimally transduced into electrons without loss.

A further requirement of the scintillator is mechanical stability. For installation the scintillator is fixed only at its outer edge. The relatively large x-ray converter element (for example 44 cm×44 cm) can oscillate similar to a drum head. During operation, and even more during transport, the x-ray detector is exposed to significant shocks and vibrations, for example given freight vehicle or rail transport.

In order to ensure that the scintillator is not damaged by such oscillations, URL http://sales.hamamatsu.com/assets/pdf/parts_J/ALS_ACS_FOS.pdf) discloses using use converter layers in which case the scintillator made from Cdl:Tl is applied either on a 1 mm-thick carrier made from aluminum, or on a 2 mm-thick carrier made from amorphous carbon. In order to achieve a sufficient mechanical stability, care must be taken that these layer thickness are observed as a minimum.

Since the carrier is arranged in the beam path in front of the scintillator, however, it acts as a ray filter. The energy that is absorbed in the carrier is therefore no longer available for light generation in the scintillator.

The transmission for x-ray radiation given 2 mm amorphous carbon is good, only slightly reducing the transmission for x-ray energies smaller than 30 keV. A disadvantage of the use of amorphous carbon is its high price.

In contrast to this, aluminum is a low-priced material. A disadvantage in the use of aluminum is its relatively low transmission for x-ray energies less than 40 keV.

SUMMARY OF THE INVENTION

An object of the present invention is to provide an x-ray converter element that can be produced in a cost-effective manner, in particular for radiography that generates a qualitatively good x-ray exposure with a good mechanical stability.

The object is inventively achieved by an x-ray converter element according to the invention having an x-ray-permeable and moisture-impermeable substrate, an x-ray-permeable carrier that is connected to the substrate, a scintillator that is applied on the substrate, and an optically-transparent and moisture-impermeable protective layer that covers the scintillator.

Instead of a single carrier that also serves as a substrate for the scintillator, according to the invention a substrate and a carrier connected thereto are provided. A significantly greater flexibility in the manufacture of an x-ray converter element is obtained via the inventive solution: composite of substrate and carrier. The carrier can be selected with regard to a good mechanical stability with simultaneously low absorption of the incident x-ray radiation. For the substrate to be connected with the carrier, its suitability for the scintillator manufacturing procedure can simultaneously be observed to in addition to likewise optimally low absorption.

In the x-ray converter element according to the invention, in a first production step the scintillator is typically applied on the x-ray-permeable and moisture-impermeable substrate. The scintillator is subsequently provided with an optically-transparent and moisture-impermeable protective layer. These production steps occur at high temperatures and in a vacuum. After the conclusion of the vacuum process, the composite made from substrate, scintillator and protective layer is connected on the substrate side with the x-ray-permeable carrier.

According to a preferred embodiment, the x-ray-permeable and moisture-impermeable substrate of the x-ray converter element comprises aluminum, whereby the substrate typically exhibits a layer thickness of 20 µm to 600 µm (advantageously of 300 µm).

According to a further embodiment, the x-ray-permeable carrier is formed of carbon fiber-reinforced plastic, the preferred layer thickness being 500 µm to 2500 µm, advantageously 1000 µm. Plates made from carbon fiber-reinforced plastic are relatively cost-effective and available in all form factors.

The connection between carrier and substrate is advantageously realized by an x-ray-permeable adhesive layer that exhibits a layer thickness of (advantageously) 10 μm to 200 μm. The adhesive layer, which must be very homogeneous and can exhibit no bubbles, can be realized, for example, as an adhesive film. Alternatively, the adhesive layer can be applied by silk-screening methods. In the selection of the adhesive material it must be inserted to that it is not a material that is embrittled by the incident x-ray radiation so as to lose its original properties.

In accordance with the invention, the scintillator of the x-ray converter element can embody CsI:Tl, CsI:Na, NaI:Tl or a similar material that includes at least one alkali halogenide. The layer thickness of the scintillator is advantageously 500 μm. In radiography a high absorption is therewith obtained for the range of 45 to 150 kVp (maximum voltage at the x-ray tube).

The optically-transparent and moisture-impermeable protective layer can, for example, exhibit a layer design, for example, according to German patent application filed on 11 May 2006 with number 10 2006 022 138.9. An embodiment corresponding to the German patent application filed on 24 May 2006 with the number 10 2006 024 893.7 can also be used for this protective layer.

DESCRIPTION OF THE PREFERRED
EMBODIMENTS

Figure 1:
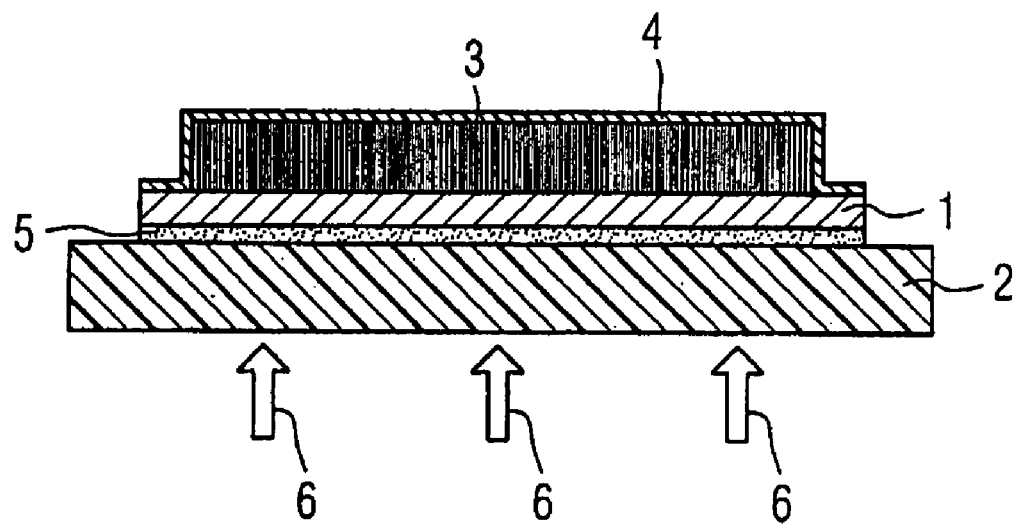
FIG. 1 shows a first embodiment of an x-ray converter element in schematic section view.
Figure 2:
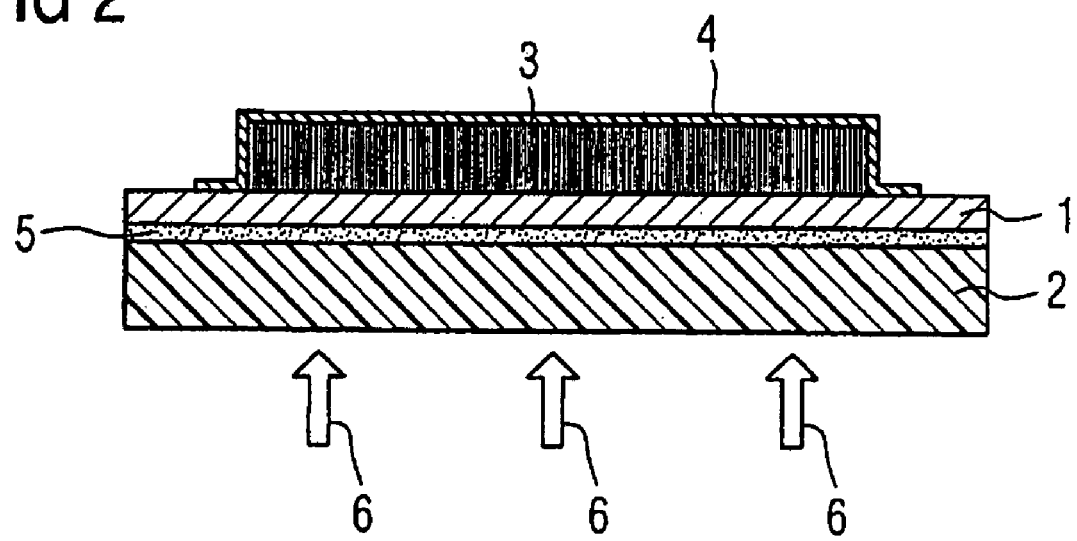
FIG. 2 shows a second embodiment of an x-ray converter element in schematic section view.

In the x-ray converter element shown in FIGS. 1 and 2 an x-ray-permeable and moisture-impermeable substrate is designated with 1 that is formed of aluminum and advantageously exhibits a layer thickness of 300 μm.

According to the invention the substrate 1 is connected to an x-ray-permeable carrier 2 that is composed of carbon fiber-reinforced plastic and advantageously exhibits a layer thickness of 1000 μm.

A scintillator 3 that includes CsI:Tl (cesium iodide doped with thallium) and exhibits a layer thickness of (advantageously) 500 μm is applied on the substrate 1.

The scintillator 3 is protected by an optically-transparent and moisture-impermeable protective layer 4.

In the exemplary embodiments shown in FIGS. 1 and 2, the substrate is connected to the carrier 2 by an x-ray-permeable adhesive layer 5.

In accordance with the invention, the substrate 1 can be smaller than the carrier 2 (see FIG. 1) or exactly as large as the carrier 2 (see FIG. 2). In the exemplary embodiment according to FIG. 1, no forces (from screwing or clamping) act on the substrate 1 for affixing the x-ray converter element.

An x-ray radiation (designated with 6 in FIGS. 1 and 2) initially radiates through the x-ray-permeable carrier 2 in order to subsequently pass through the adhesive layer 5 and the x-ray-permeable and moisture-impermeable substrate 1 and generate visible light in the scintillator 3. The visible light generated in the scintillator 3 exits through the optically-transparent and moisture-impermeable protective layer 4. The light image so generated is projected onto a CCD camera with the aid of imaging optics. The CCD camera transduces the light image into electrical signals. The electrical signals are subsequently processed further and output as a digital image.

Figure 3:
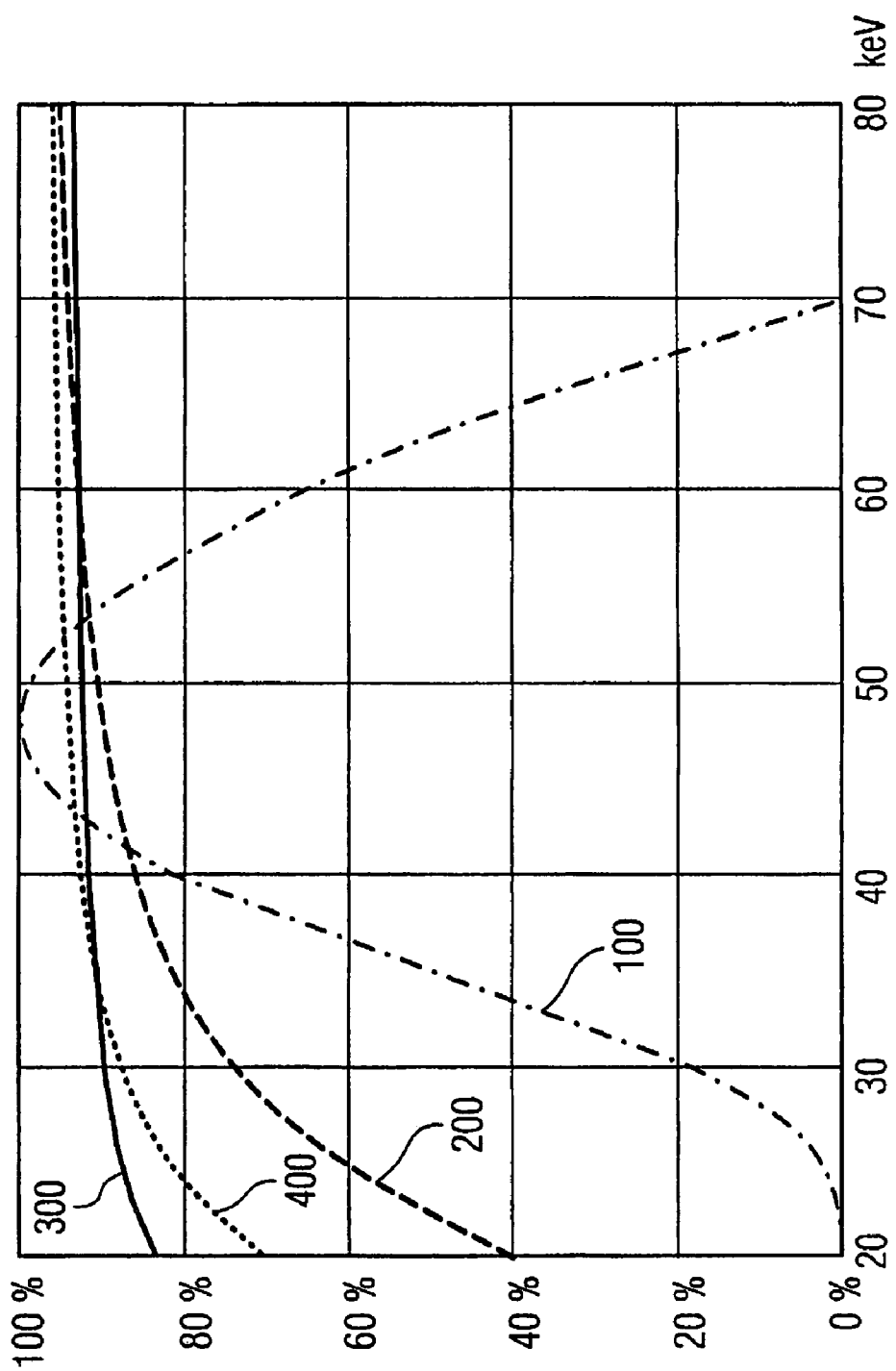
FIG. 3 shows characteristic lines for the transmission of various substrates, carriers and combinations thereof, dependent on x-ray energy, as well as a typical x-ray spectrum for general radiography.

Various transmissions dependent on the x-ray energy are shown in FIG. 3. The characteristic line of the transmission of aluminum with a layer thickness of 1000 μm is designated with 200. The characteristic line of the transmission of a 2000 μm-thick layer made from amorphous carbon is designated with 300. The characteristic line of the transmission for a composite made from 300 μm aluminum and 1000 μm carbon fiber-reinforced plastic is designated with 400.

Furthermore, a characteristic line of a typical x-ray spectrum (designated with 100) of general radiography after passage of the x-ray radiation through a human body is shown for assessment of the transmission properties of the various substrates, carriers or, respectively, combinations, whereby the human body was simulated by 3 mm aluminum and 15 cm PMMA (polymethylmethacrylate, known as "Plexiglass").

The x-ray quanta have energies greater than 40 keV. For these x-ray energies the transmission of the composite made from 300 μm aluminum and 1000 μm carbon fiber-reinforced plastic (characteristic line 400) is slightly higher than that of 2000 μm amorphous carbon (characteristic line 300).

In the range between 30 and 40 keV there is no noteworthy contribution to the x-ray spectrum (characteristic line 100). The transmission properties in this x-ray energy interval are thus important. In this x-ray energy interval the permeability of the composite made from 300 μm aluminum and 1000 μm carbon fiber-reinforced plastic (characteristic line 400) is distinctly better than the permeability of 1000 p aluminum (characteristic line 200) and comparable with the permeability of 2000 μm amorphous carbon (characteristic line 300).

Only a small portion of the x-ray energy is present in the range smaller than 30 keV, meaning that the transmission properties in this range are of subordinate importance. In this range the usage of 2000 μm amorphous carbon (characteristic line 300) instead of the composite made from 300 μm aluminum and 1000 μm carbon fiber-reinforced plastic (characteristic line 400) brings slightly higher transmission values. The practical value for the image quality is slight, however.

The inventive composite made from the carrier 2 and the substrate 1 essentially satisfies three requirements. It represents in an ideal manner a suitable substrate for the process of the scintillator coating (increased temperatures and vacuum) and simultaneously offers a sufficient mechanical stability, whereby the incident x-ray radiation is only insignificantly attenuated in the relevant range of the x-ray energy (see FIG. 3).

In contrast, the solutions according to the prior art utilize as the substrate and the carrier a single body that must satisfy all three requirements. As explained in the preceding, this does not operate in a particularly satisfactory manner.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray converter element comprising:
an x-ray permeable and moisture-impermeable substrate;
an x-ray permeable planar carrier having a side with a planar area facing said substrate, said carrier being substantially parallel to and spaced from said substrate;
an x-ray permeable adhesive layer connecting said side of said carrier to said substrate and filling a space between said carrier and said substrate, defined by said planar area of said substrate, and forming, with said carrier and said substrate, a mechanically stable composite element;

a scintillator applied directly on said composite element against said substrate; and an optically-transparent and moisture-impermeable protective layer covering said scintillator.

2. An x-ray converter as claimed in claim 1 wherein said substrate is comprised of aluminum.

3. An x-ray converter as claimed in claim 1 wherein said substrate has a thickness in a range between 20 µm and 600 µm.

4. An x-ray converter as claimed in claim 3 wherein said substrate has a thickness of 300 µm.

5. An x-ray converter as claimed in claim 1 wherein said carrier is comprised of carbon fiber-reinforced plastic.

6. An x-ray converter element as claimed in claim 1 wherein said carrier has a thickness in a range between 500 µm and 2500 µm.

7. An x-ray converter element as claimed in claim 6 wherein said carrier has a thickness of 1000 µm.

8. An x-ray converter element as claimed in claim 1 wherein said adhesive layer has a thickness in a range between 10 µm and 200 µm.

9. An x-ray converter element as claimed in claim 1 wherein said scintillator is comprised of at least one material selected from group consisting of CsI:Tl, CsI:Na and NaI:Tl.

10. An x-ray converter as claimed in claim 1 wherein said scintillator is comprised of a material comprising at least one alkali halogenide.

11. An x-ray converter as claimed in claim 1 wherein said scintillator has a thickness of 500 µm.

12. An x-ray converter element comprising:

an x-ray-permeable and moisture-impermeable substrate comprised of aluminum;

an x-ray-permeable planar carrier comprised of carbon fiber-reinforced plastic said carrier having a side with a planar area facing said substrate and being disposed substantially parallel to and spaced from said substrate;

an x-ray-permeable adhesive layer connecting said substrate to afiist said side of said carrier and filling a space between said carrier and said substrate, defined by said planar area of said substrate, and forming, with said carrier and said substrate, a mechanically stable composite element;

a scintillator applied directly on said composite element against said substrate; and an optically-transparent and moisture-impermeable protective layer covering said scintillator.

13. An x-ray converter element as claimed in claim 12 wherein said substrate has a thickness in a range between 20 µm and 600 µm, said carrier has a thickness in a range between 500 µm and 250 µm, said adhesive layer has a thickness in a range between 10 µm and 200 µm, and said scintillator has a thickness of 500 µm.

* * * * *